March 19, 1940. C. H. TAYLOR 2,193,947
AUTOMATIC HAND TRUCK BRAKE
Filed Oct. 6, 1938 2 Sheets-Sheet 1
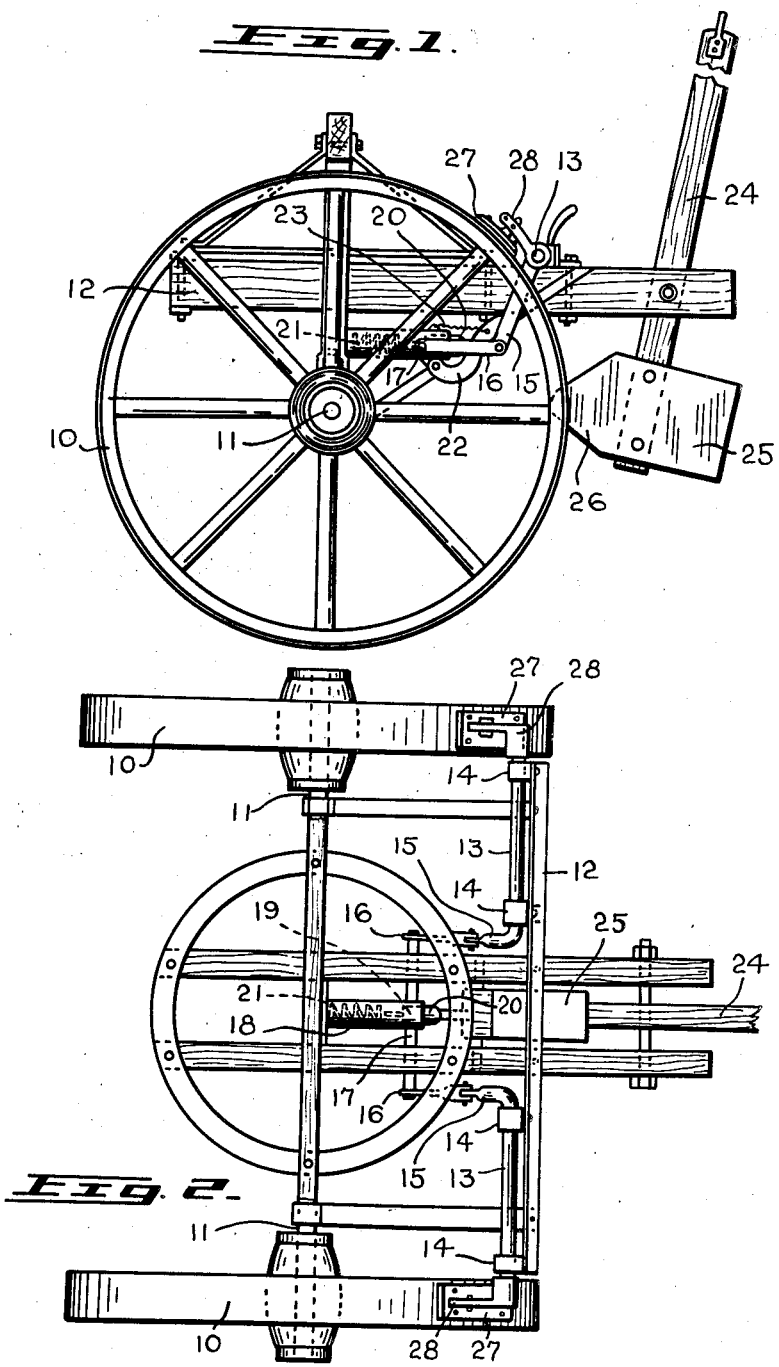
INVENTOR
Calvin H. Taylor
By Ralph Burch
Attorney March 19, 1940.   C. H. TAYLOR   2,193,947
AUTOMATIC HAND TRUCK BRAKE
Filed Oct. 6, 1938   2 Sheets-Sheet 2
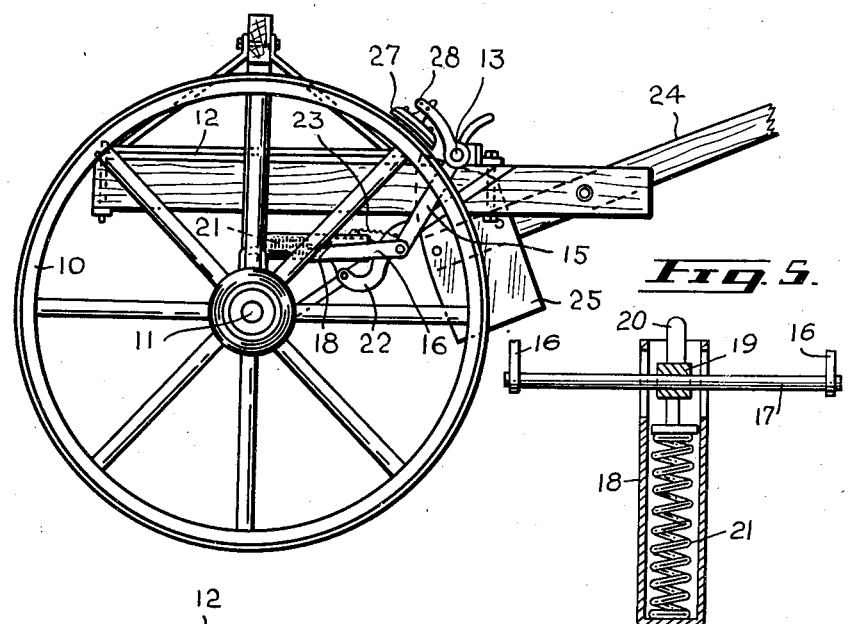
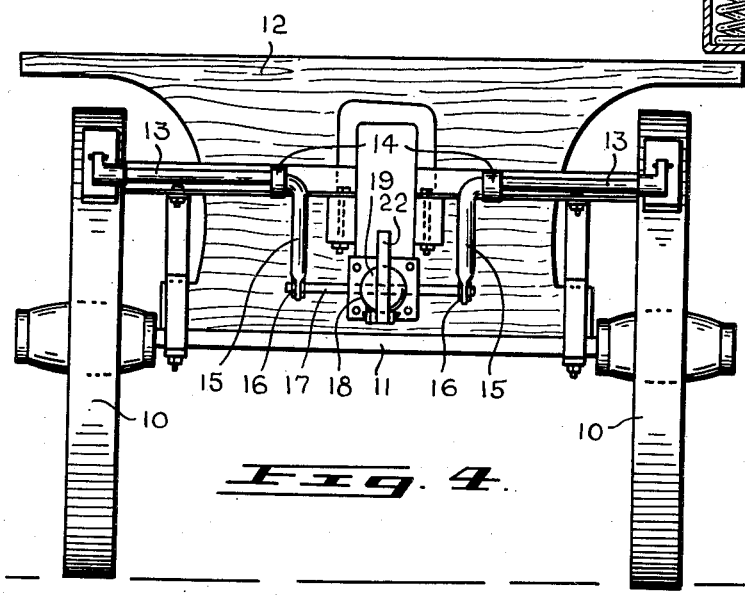
INVENTOR
Calvin H. Taylor
By Ralph Burch
Attorney Patented Mar. 19, 1940

2,193,947

UNITED STATES PATENT OFFICE 2,193,947

AUTOMATIC HAND TRUCK BRAKE

Calvin Howard Taylor, Cobalt, Ontario, Canada

Application October 6, 1938, Serial No. 233,665

4 Claims. (Cl. 188—21)

This invention relates to improvements in an automatic hand truck brake. Its primary object being to provide a truck to be drawn by hand and of the type commonly used at railway stations which is provided with automatic brake means to prevent inadvertent movement of the truck.

A further object of the invention is to devise and construct a truck of the type described having brake means automatically operated by the movement of the draw bar to apply the brake when the said draw bar is released.

Wih these and other objects in view that may appear while the description proceeds the invention consists in the novel construction and arrangement of parts as hereinafter more specifically set forth, claimed and shown in the accompanying drawings forming part of this application and in which:

Fig. 1 is a side elevation of the device showing the brake in operating position.

Fig. 2 is a plan view of the same.

Fig. 3 is a side elevation showing the brake in the inoperative position.

Fig. 4 is a partial front elevation.

Fig. 5 is a detail sectional view of the brake applying spring.

Referring more in detail to the drawings in which similar reference characters designate corresponding parts throughout the several parts it will be seen the invention comprises a front truck of a standard type of station baggage wagon having a pair of wheels 10 mounted on an axle 11 supporting the truck frame 12.

The brake mechanism consists of a pair of similar crank shafts 13 mounted in bearings 14 on the truck frame and having cranks 15 formed on the inner end. Said cranks are connected by means of connecting links 16 to an equalizer bar 17. Said bar is slidably mounted laterally in longitudinal slots in a tubular spring casing 18. A yoke 19 also slidable in said spring casing engages said equalizer bar centrally and is provided with a projection 20 which protrudes from the end of the spring casing. The spring 21 enclosed in the casing normally bears on the yoke and hence on the equalizer bar in a manner to actuate the mechanism to apply the brakes. A crank 22 is pivotally mounted on the spring casing and extends upward and outward therefrom to engage the said projection 20 and is held normally in this position by a spring 23.

The truck draw bar 24 is pivotally mounted in the truck frame for vertical movement in the said frame and a weight 25 is mounted on the inner end thereof to depress the short inner end when the handle is released. When the handle is pulled downward to draw the truck the weight which has a wedge shaped end 26 engages the end of the crank 22 and pushes the same inward against the tension of the spring 21 as the same is raised.

The brake shoes 27 are adjustably mounted on cranks 28 attached to the crank shafts 13 and are adjusted to engage the periphery of the wheels 10 when the handle is in the raised position and are held in engagement by the tension of the spring 21.

As the handle is brought downward to enable the operator to move the truck the weight is raised and engages the yoke projection to move the same inward against the tension of the spring and thereby moves the crank to raise the brake shoes from the wheels.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of cooperating elements may be resorted to within the scope of what is claimed without departing from the spirit of the invention.

I claim:

1. In a truck brake as described, comprising a frame mounted on a pair of wheels, a draw bar mounted for pivotal movement in a vertical plane with respect to said frame, a spring actuated brake mechanism mounted on the frame, having brake shoes normally engaging the periphery of the wheels by the spring tension, said mechanism being actuated by the draw bar to retract the spring and disengage the brakes by the movement of the draw bar, and means to normally disengage said draw bar from the brake mechanism.

2. In a truck brake as described, comprising a frame mounted on a pair of wheels, a draw bar mounted for pivotal movement in a vertical plane with respect to said frame, crank shafts rotatably mounted in bearings on said frame having a crank formed on the inner end of each, an equalizer bar attached to said cranks by connecting links, a crank formed on each outer end of said shafts oppositely disposed to the inner cranks and having brake shoes thereon, spring means connected to said equalizer bar and to the frame, the tension of same being arranged to normally move the brakes into engagement with the wheels and means associated with said draw bar adapted to retract said spring means to release the brakes when the draw bar is pulled downward.

3. In a truck brake as described, comprising a frame mounted on a pair of wheels, a draw bar mounted for pivotal movement in a vertical plane with respect to said frame, crank shafts rotatably mounted in bearings on said frame, inner cranks formed thereon and a crank on each outer end thereof oppositely disposed to the inner cranks and having brake shoes thereon, spring means indirectly connected to said inner cranks and to the frame, the tension of same being arranged to normally move the brakes into engagement with the wheels, an equalizer bar connected by links to each of said inner cranks and a yoke connected thereto and associated with said spring means, a wedge shaped weight on the inner end of the pivotally mounted draw bar, said weight arranged to engage said yoke as the handle of the draw bar is pulled downward into operating position and push the crank rearward and thereby raise the brake shoes out of engagement with the wheels, substantially as set forth.

4. An automatic braking mechanism for trucks comprising a frame mounted on a pair of wheels, crank shafts mounted on said frame having inner and outer cranks on the ends thereof, brake shoes attached to the outer cranks of said shafts for engagement with the wheels of said frame, an equalized bar connecting the inner cranks of said shafts, a spring exerting pressure on said bar to normally move said shafts to apply said brake shoes, and a draw bar mounted on said frame for pivotal movement in a vertical plane, said draw bar being adapted to retract said spring when moved downwardly thereby releasing the brakes.

CALVIN HOWARD TAYLOR.